Figure 1:
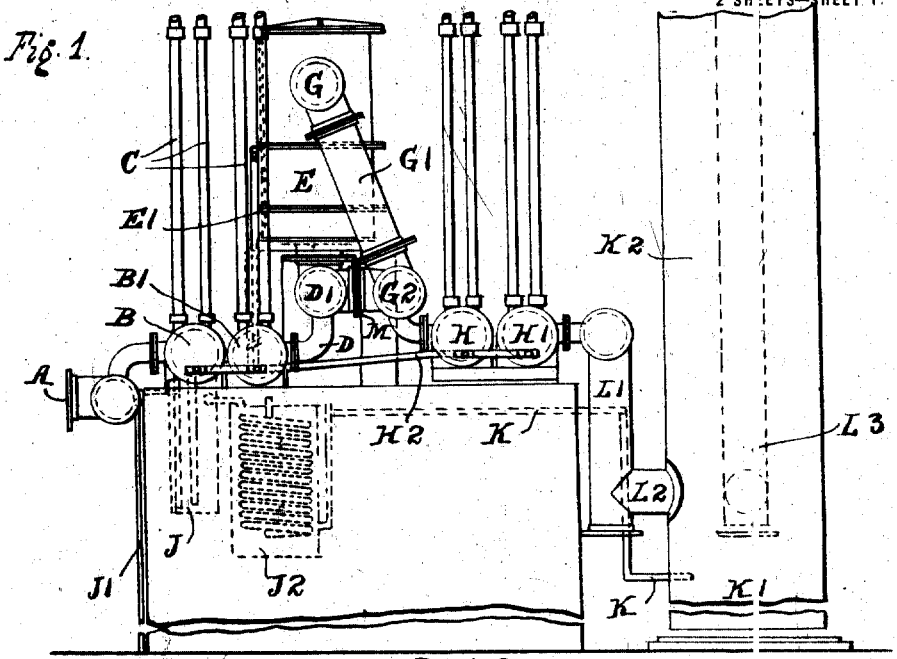

Q. MOORE.
PROCESS FOR THE TREATMENT AND RECOVERY OF TAR AND AMMONIA LIQUOR FROM PRODUCER OR OTHER GAS.
APPLICATION FILED JAN. 26, 1915.

1,215,300.

Patented Feb. 6, 1917
2 SHEETS—SHEET 1.

WITNESSES

INVENTOR
Quintin Moore
BY
Johnson and Johnson
ATTORNEYS

Q. MOORE.
PROCESS FOR THE TREATMENT AND RECOVERY OF TAR AND AMMONIA LIQUOR FROM PRODUCER OR OTHER GAS.
APPLICATION FILED JAN. 26, 1915.

1,215,300.

Patented Feb. 6, 1917.

INVENTOR
QUINTIN MOORE
BY Hinson and Hinson
his ATTORNEYS

UNITED STATES PATENT OFFICE.

QUINTIN MOORE, OF RIDDRIE, GLASGOW, SCOTLAND.

PROCESS FOR THE TREATMENT AND RECOVERY OF TAR AND AMMONIA LIQUOR FROM PRODUCER OR OTHER GAS.

1,215,300.  Specification of Letters Patent.  Patented Feb. 6, 1917.

Application filed January 26, 1915. Serial No. 4,003.

*To all whom it may concern:*

Be it known that I, QUINTIN MOORE, a subject of the King of Great Britain and Ireland, and a resident of Riddrie, Glasgow, Scotland, have invented a certain new and useful Improved Process for the Treatment and Recovery of Tar and Ammonia Liquor from Producer or other Gas, of which the following is the specification.

This invention has for its object to provide an improved process of plant for the treatment and recovery of tar and ammonia liquor from producer or other gas, and is such that uniform and dehydrated tar and highly concentrated ammonia liquor are obtained.

According to the invention the gas leaving the producer or retorts is led into one or more air- or water-cooled condensers wherein its temperature is reduced to a temperature most suitable for the extraction of the tar—this temperature ranging between about 100 and 160 degrees Fahrenheit in accordance with the quality of the tar present. From the condenser chest or chests the gas passes to any convenient form of tar extractor which is arranged at such a higher level than the chests of the condensers that tar and water of condensation from the extractor may flow back to the chests as hereinafter explained.

The gas after leaving the tar extractor may either be further cooled to atmospheric temperature in any convenient form of condenser previous to being treated by the water of condensation from the condenser chests for the extraction of the ammonia (this water of condensation being first cooled as hereinafter explained). Or the ammonia may first be extracted in an acid bath and the gas then cooled.

The tar and the condensed steam after reaching the condenser chests from the tar extractor flow back therethrough to an exit near the entrance for the gases. In the course of passing through the chests in a direction contrary to the flow of the gases, the tar which is partially suspended in a globular form in the water comes into contact with the hot gases. It is thereby so thoroughly heated that dehydration takes place, while the light and heavy tars are thoroughly mixed and a tar of uniform consistency obtained.

The tar and the virgin liquor (that is the water of condensation from the gases) pass from the condensers into a separator of any suitable known construction and are automatically separated by decantation, the tar passing to the tar well.

The virgin liquor overflows from the separator into a heat exchanger preferably in the form of a tank fitted with a coil of piping through which cold water is passed. The virgin liquor gives up its heat to the water, and the water thus heated may be used as the supply for a usual water jacket surrounding the producer, thus facilitating the production of steam in that jacket.

The now cooled virgin liquor is led to a tower, to which the cooled gases are also led, the liquor and gases passing through this tower in opposite directions, so that the ammonia is thoroughly washed from the gas by this liquor, and as the latter is thoroughly cooled before it enters the washing tower, a strong ammonia liquor solution is obtained.

Where the gas is further cooled after leaving the tar extractor and before it reaches the washing tower, the water of condensation from these condensers is led back to the chest or chests of the first set of condensers, so that all the virgin liquor is collected at one place.

Figure 2:
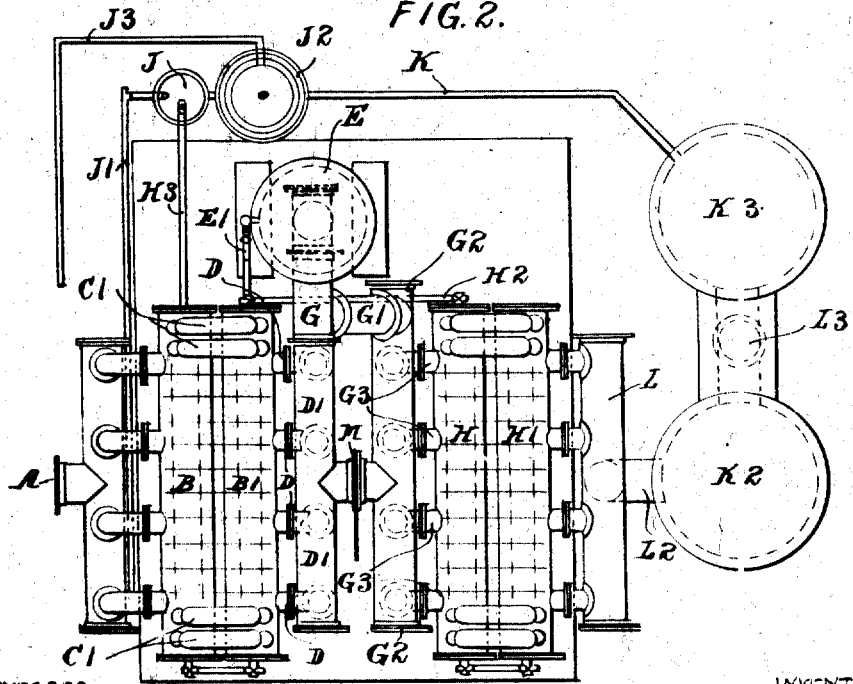
Figure 3:
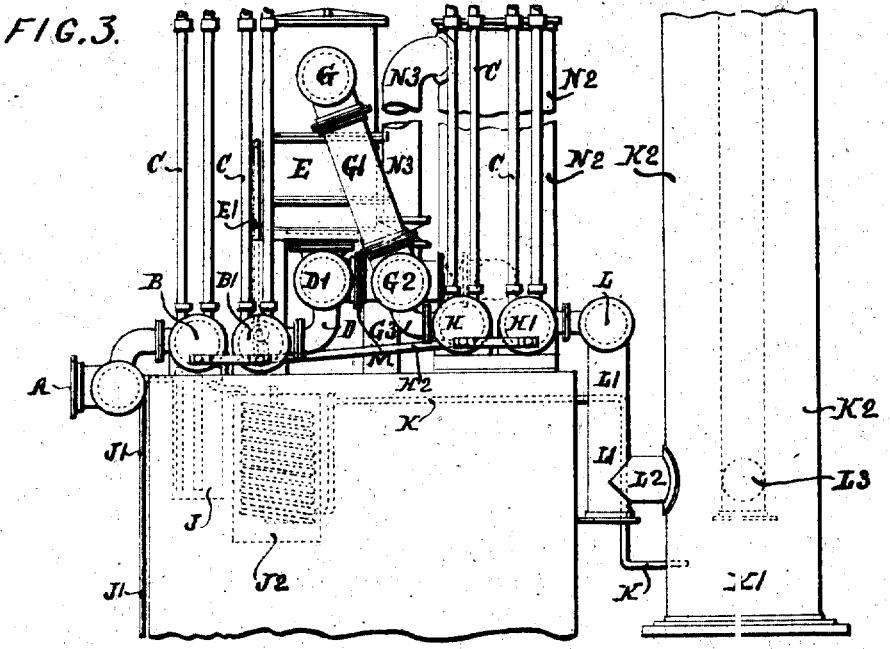
Figure 4:
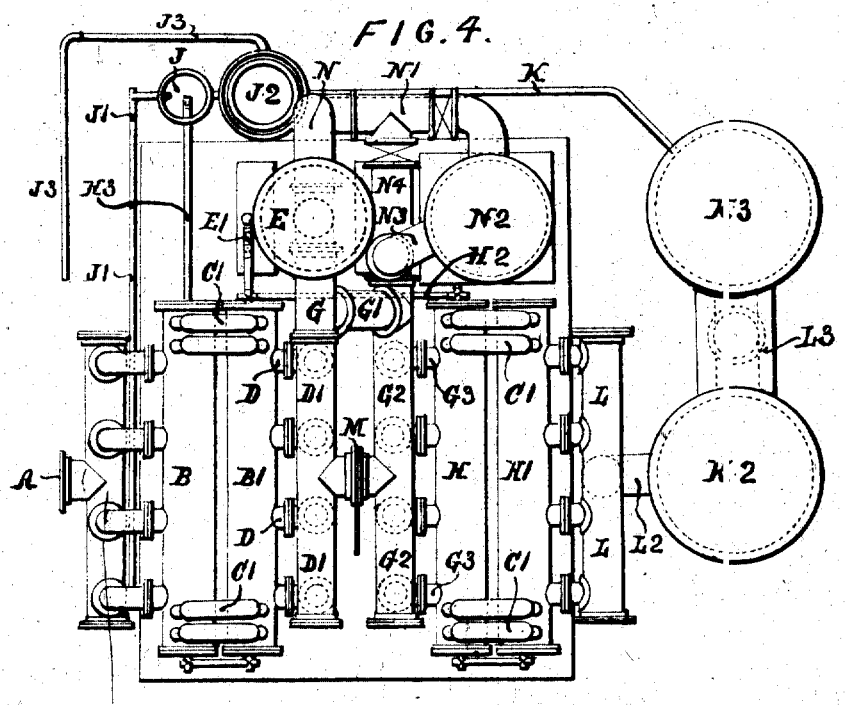

Two examples of typical apparatus for the carrying out of the improved process are diagrammatically illustrated on the accompanying sheets of explanatory drawings, Figure 1 being an elevation and Fig. 2 a plan of one example, while Figs. 3 and 4 are similar views showing a second example.

In the example of apparatus shown in Figs. 1 and 2 the gas from the producer or retorts enters by a connection A and passes to an air cooled condenser wherein its temperature is reduced as already set forth to that satisfactory for the extraction of its tar.

This condenser is of known form and consists of two chests B, $B^1$ connected together by vertical pipes C and headers $C^1$. From the second chest $B^1$ of the condenser the gases pass by pipe connections D to a horizontal main D¹ opening at one end into the lower end of a tar extractor E, which may be of any convenient known form. This extractor is arranged at such a higher level than the chests of the condenser that tar and water of condensation from the extractor flow back to the second chest B¹ by a pipe connection E¹.

The gas after leaving the tar extractor E is led by pipe connections G, G¹ to a second horizontal main G² from which it passes by further pipe connections G³ to the first chest of a second atmospheric condenser H, H¹, similar in construction to the first condenser. The tar and water of condensation from this second condenser pass back by a pipe H² connecting the first chest of this second condenser with the pipe connection E¹ leading from the tar extractor to the second chest B¹ of the first condenser. The tar and condenser steam flow back through the two chests of the first condenser in a direction contrary to the flow of the gases, and the tar therefore comes into contact with the hot gases. It is thereby so thoroughly heated that dehydration takes place, while the light and heavy tars are thus also thoroughly mixed and a tar of uniform consistency obtained.

The tar and water of condensation from the gases pass from the first chest of the first condenser by a pipe H³ into a separator J which is of any suitable known construction, and they are there automatically separated by decantation. The tar passes from this separator by a pipe J¹ to a tar well or storage tank.

The virgin liquor (that is the water of condensation from the gases) overflows from the separator J into a heat exchanger J² in the form of a tank in which is a coil of piping through which cold water is passed. The virgin liquor gives up its heat to the water, and the water thus heated may be used as the supply for a usual water jacket surrounding the producer, the water passing from the heat exchanger by a pipe J³ to the water jacket. Thus the production of steam in that jacket is facilitated.

The now cooled virgin liquor is led from the heat exchanger J² by a pipe connection K to a sump K¹ beneath gas scrubbers or towers K², K³ to which the gas from a final horizontal main L connected with the second chest H¹ of the second atmospheric condenser is also led by pipe connections L¹, L². The two scrubbers are connected together in known manner by intermediate pipe connections L³ and the liquor is pumped as usual from the sump K¹ to the top of the scrubbers. Thus the liquor and gases pass through the towers in opposite directions. The ammonia is therefore thoroughly washed from the gas by this liquor, and as the latter is thoroughly cooled before it enters the washing towers, a strong ammonia liquor solution is thereby obtained.

A valve connection M is made between the horizontal mains D¹, G², and similar valve connections (not shown) are made between the main D¹ and the tar extractor E, also between the pipe connections G, G¹, leading from the extractor to the horizontal main G². Normally the valve connection M is closed and the other valves referred to open, but in the event of it being necessary to shut off the tar extractor for examination or repair, the valve M is opened and the other shut. When this is the case, the tar extractor is cut out, the gas passing directly from the first condenser to the second.

The example of the apparatus shown in Figs. 3 and 4 differs from that hereinbefore described only in that the gas, after leaving the tar extractor E, passes by pipe connections N, N¹ to an acid tower N² where it is treated, in known manner, for the extraction of the ammonia therefrom. From the acid tower the gas passes by the further pipe connection N³ to an extension N⁴ on the second horizontal main G², after which it passes through the second atmospheric condenser, H, H¹, to be cooled, as described.

Valve connections are fitted in the pipe connection N¹, and between it and the extension N⁴ so that the acid tower may be shut off when desired and of course when the acid tower is in use the valve connection between the pipes G, G¹, is closed.

What I claim is:—

1. Process for the treatment and recovery of tar and ammonia liquor from producer and other gas in which the gas is first cooled in condensers to a temperature suitable for the extraction from it of tar and is then led through a tar extractor from which tar and water of condensation flow back to the condenser and travel therein generally opposite to the flow of the gas, the gas after leaving the extractor being further cooled, the tar and liquor leaving the condensers being separated and the liquor cooled and used in towers or scrubbers to wash the gases as described.

2. Process for the treatment and recovery of tar and ammonia liquor from producer and other gas in which the gas is first cooled in condensers to a temperature suitable for the extraction from it of tar and is then led through a tar extractor from which tar and water of condensation flow back to the condenser and travel therein generally opposite to the flow of the gas, the gas after leaving the extractor being treated in an acid bath and then further cooled, the tar and liquor leaving the condensers being separated and the liquor cooled.

3. The process for recovering tar from hot gas, which consists in cooling the gas, leading the cooled gas through a tar extractor, leading the extracted tar back into contact with the hot gases in the condenser whereby the tar is dehydrated and the light and heavy tars mixed, and recovering the thus dehydrated tar in a condition of practically uniform consistency.

4. The process for recovering tar from hot gas, which consists in cooling the gas to a temperature between 100° F. and 160° F., leading the cooled gas through a tar extractor, leading the extracted tar back into contact with the hot gases in the condenser whereby the tar is dehydrated and the light and heavy tars mixed and recovering the thus dehydrated tar in a condition of practically uniform consistency.

In testimony whereof I have signed my name to this specification in the presence of two subscribing witnesses.

QUINTIN MOORE.

Witnesses:
DAVID FERGUSON,
WILFRED HUNT.